United States Patent [19]

Lillibridge

[11] Patent Number: 4,602,795
[45] Date of Patent: Jul. 29, 1986

[54] THERMALLY EXPANSIVE SLIP JOINT FOR FORMED SHEET METAL SEALS

[75] Inventor: Herbert J. Lillibridge, Plainville, Conn.

[73] Assignee: United Technologies Corporation, Hartford, Conn.

[21] Appl. No.: 805,539

[22] Filed: Dec. 6, 1985

[51] Int. Cl.⁴ .............................................. F16J 15/08
[52] U.S. Cl. ..................................... 277/236; 277/26; 277/205; 277/213
[58] Field of Search .............. 277/205, 206 R, 207 R, 277/212 R, 212 C, 213, 236, 26

[56] References Cited

U.S. PATENT DOCUMENTS 2,761,707  9/1956  Herman ......................... 277/236 X
3,192,690  7/1965  Taylor ............................ 277/236 X
3,240,501  3/1966  Smith ............................ 277/213 X
4,185,858  1/1980  Peash ............................ 277/236 X

FOREIGN PATENT DOCUMENTS 550298  12/1922  France ........................... 277/206 R Primary Examiner—Robert S. Ward
Attorney, Agent, or Firm—Charles A. Warren

[57] ABSTRACT

A metallic seal ring which has a gap between its ends to allow for thermal expansion, the gap being closed by a slip joint fitting within the ends of the ring and secured at one end only to one end of the ring with lthe other end of the joint free to slide within the ring and with the shape of the joint conforming in general to that of the seal ring.

4 Claims, 4 Drawing Figures

THERMALLY EXPANSIVE SLIP JOINT FOR FORMED SHEET METAL SEALS

DESCRIPTION

1. Technical Field

A formed sheet metal slip joint is used in a full ring seal requiring a gap at the ends for thermal closure.

2. Background Art

In many situations where a compressible sheet metal seal ring is required, it is necessary to allow a gap between the ends of the seal ring for thermal expansion when the temperature changes during operation are significant. It is usual to accept the leakage through the gap and to make the gap as small as possible to allow for the necessary thermal expansion. The present invention attempts to significantly fill this gap thereby reducing the leakage flow either radially or axially by a unique slip joint between the ends of the ring.

DISCLOSURE OF INVENTION

According to the present invention, the metallic seal ring is preferably substantially W-shaped in cross section and a similarly shaped slip joint is positioned between the ends with the ends of the joint entering the ends of the ring. A particular feature of this joint is that it is secured only at one end to the ring and also preferably only at one side of the ring in order to keep the joint properly located across the gap and to allow the necessary thermal expansion by sliding of the joint at the unfastened end.

The foregoing and other objects, features and advantages of the present invention will become more aparent from the following description of preferred embodiments and accompanying drawings.

BEST MODE FOR CARRYING OUT THE INVENTION

Figure 1:
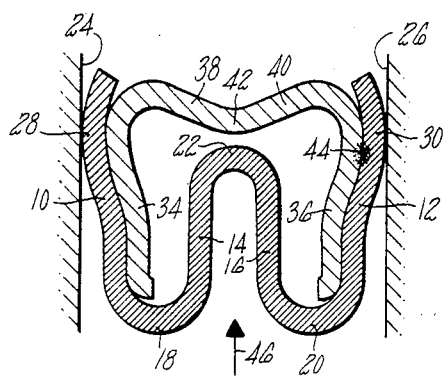
FIG. 1 is a sectional view through the joint.

The invention is shown in a slip joint 2 (FIG. 2) between the ends 4 and 6 of a sheet metal ring seal 8. The latter is used in any situation requiring a sheet metal compressible seal with a gap to provide for thermal expansion. The ring seal 8 is preferably W-shaped in cross section having outer legs 10 and 12 (FIG. 1) and inner legs 14 and 16 connected to the bases of the legs 10 and 12 resepctively by arcuate bases 18 and 20. The inner legs are connected at their upper ends by an arcuate portion 22 and the outer legs 10 and 12 are curved from end to end so the free upper ends of these legs will be out of contact with the walls 24 and 26 between which the seal is positioned. Thus the curved portions 28 and 30 of the outer legs are the portions engaging the opposite walls between which the seal is positioned.

Figure 2:
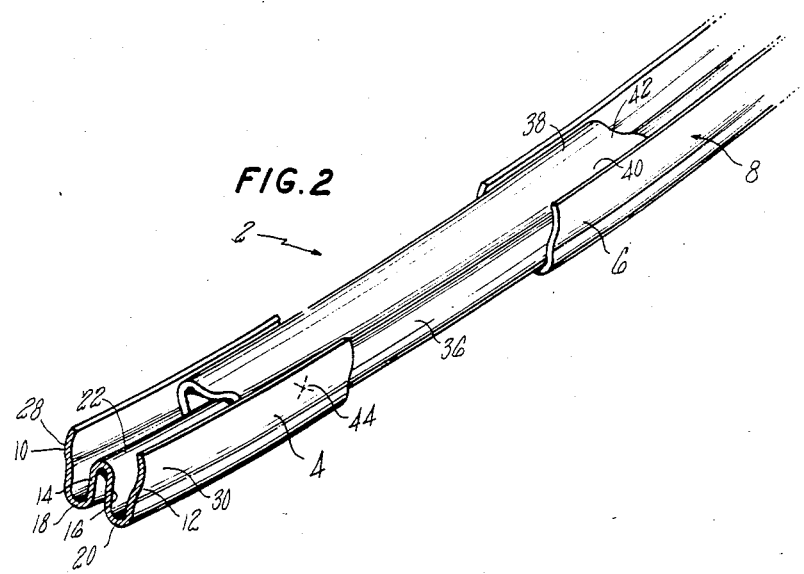
FIG. 2 is a prospective view of the ends of the ring with the joint positioned therein.

When the ends of the ring are spaced apart to allow for expansion the slip joint 2 is provided and the ends of this joint are received within the opposite ends of the ring seal as shown in FIG. 2. The cross-sectional shape of this joint may vary and may for example be W-shaped with the outer legs 34 and 36 similar in shape to the outer legs of the ring and fitting closely therein as shown in FIG. 1. These legs are connected at their lower ends by inner legs 38 and 40 which are much flatter in the joint than the inner legs of the ring itself to permit a clearance between the central arcuate portion 42 of the joint and the top of the inner legs of the ring. The W of the joint is reversed with respect to the W of the ring as shown in FIG. 2.

This joint is secured to one end of the ring by a single weld 44 preferably between adjacent outer legs of the joint and ring. This permits freedom of the joint to slide within the other end of the ring but also assures that the joint will remain in its desired postion extending across the gap between the ends of the ring. With a single weld the joint is also free to expand radially and transversely adjacent the weld.

The arrangement is such that the base of the joint does not extend beyond the ends of the outer legs of the ring as shown. The flow to be sealed is generally in the direction of the arrow 46 and it will be understood that the base of the W may be at either inner diameter or outer diameter of the ring depending on the acting direction of the pressure to be sealed. With the joint conforming substantially to the shape of the ring at the sealing surface it will be shown that the leakage may be reduced as much as 90 percent as compared to a ring without a slip joint and that this does not interfer with the proper functioning of the ring. The shape of the joint is such that the entrance of the ring is sealed by the joint and its cooperating shape with the ring. The leakage past the joint is only what can occur past the outer legs and thus much less than would occur without the joint. The spacing between the ends of the ring is exaggerated in FIG. 2 as will be obvious.

Figure 3:
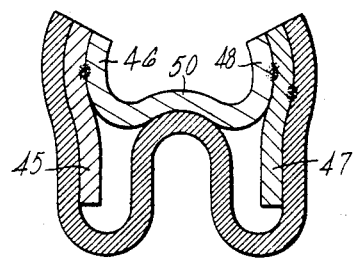
FIG. 3 is a view similar to FIG. 1 of a modification.

A modified form of joint is shown in FIG. 3 in which the joint is still W-shaped with outer legs 45 and 47 conforming in shape to the outer legs of the ring and with the inner legs 46 and 48 formed of a central piece 50 with a central arcuate portion. This separate piece is position with the ends of the legs inturn in contact with and welded to the outer legs 45 and 47 to form a single element slip joint. The arcuate center portion 50 may engage with and slide on the arcuate portion of the ring connecting the inner legs of the ring itself.

Figure 4:
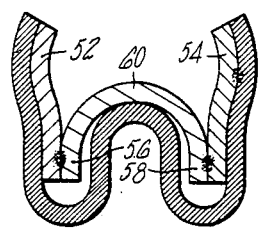
FIG. 4 is a view similar to FIG. 1 of a further modification.

A Further modification is shown in FIG. 4 in which the slip joint is also W-shaped with outer legs 52 and 54 conforming to the shape of the outer legs of the ring and with inner legs 56 and 58 connected by an arcuate portion 60. In this joint the W is positioned within the ring with the same side up as in the ring rather than reversed as in FIGS. 1 and 3. The outer ends of the inner legs conform in shape to and are welded to the outer legs of the joint to form effectively a single piece joint. Here as in FIG. 3 the arcuate portion 60 may slide on the arcuate portion of the central part of the ring.

The function of the joint in FIGS. 3 and 4 is the same as described to FIGS. 1 and 2.

It should be understood that the invention is not limited to the particular embodiments shown and described herein, but that various changes and modifications may be made without departing from the spirit and scope of this novel concept as defined by the following claims.

I claim:

1. A metallic seal ring for use in locations having large temperature changes, said ring having a gap between its ends to allow for thermal expansion, said ring being generally W-shaped in cross section with the outer legs of the W forming the sealing surfaces of the ring, and a joint extending between the ends of the ring and fitting in the ends of the ring, said joint being generally W-shaped in cross section with its outer legs conforming in shape to the outer legs of the ring and engaging the inner walls of said legs, and said joint being secured at one end only to one end of the ring, the other end of the joint being free to slide within the ring.

2. A metallic seal ring as in claim 1 in which the W of the joint is reversed with respect to the W of the ring.

3. A metallic seal ring as in claim 1 in which the base of the joint is within the confines of the outer ends of the legs of the ring.

4. A metallic seal ring as in claim 1 in which the W of the joint is reversed with respect to the W of the ring and in which the base of the W of the joint is within the confines of the outer ends of the legs of the ring.

* * * * *